G. DUNN.
LUBRICATING DEVICE FOR JOURNAL BEARINGS.
APPLICATION FILED JULY 31, 1908.

1,006,370.

Patented Oct. 17, 1911.

Witnesses:
Samuel W Balch
Frank C. Cole

Inventor,
Gano Dunn,
by Thomas Ewing Jr.,
Attorney.

UNITED STATES PATENT OFFICE.

GANO DUNN, OF EAST ORANGE, NEW JERSEY, ASSIGNOR TO CROCKER-WHEELER COMPANY, OF AMPERE, NEW JERSEY, A CORPORATION OF NEW JERSEY.

LUBRICATING DEVICE FOR JOURNAL-BEARINGS.

1,006,370.  Specification of Letters Patent.  Patented Oct. 17, 1911.

Application filed July 31, 1908. Serial No. 446,215.

*To all whom it may concern:*

Be it known that I, GANO DUNN, a citizen of the United States of America, and a resident of East Orange, county of Essex, and State of New Jersey, have invented certain new and useful Improvements in Lubricating Devices for Journal-Bearings, of which the following is a specification.

My invention relates to lubricating devices for journal bearings and is of the type commonly known as the oil-ring type.

Much difficulty has been experienced when a solid oil-ring is used with high-speed machines. The weight of the solid ring produces too great an amount of traction; the ring does not have sufficient slip and rotates so rapidly that an excessive quantity of oil is carried up and thrown off centrifugally, both from the shaft and from the ring itself. This oil leaks through the oil holes and the joints of the journal box and is very objectionable both from the standpoint of waste and of cleanliness.

The object of my invention is the production of an oil-ring which will avoid these defects. This I accomplish by making the ring light and by giving it a large external area for contact with the oil and a small area for contact with the shaft. The large external area reduces the speed by presenting an extended surface to the retarding effect of the oil through which its lower portion travels; the small area of contact with the shaft coöperates with the lightness of the ring to reduce the traction by cutting down the effective tractive adhesive surface.

To this end, my invention consists in the construction, combination and arrangement of parts, hereinafter more fully set forth and claimed.

Figure 1:
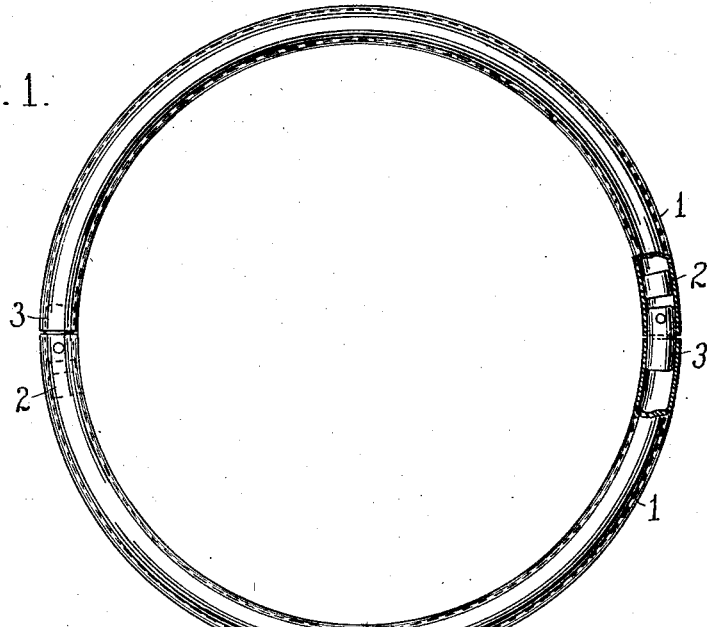
Figure 2:
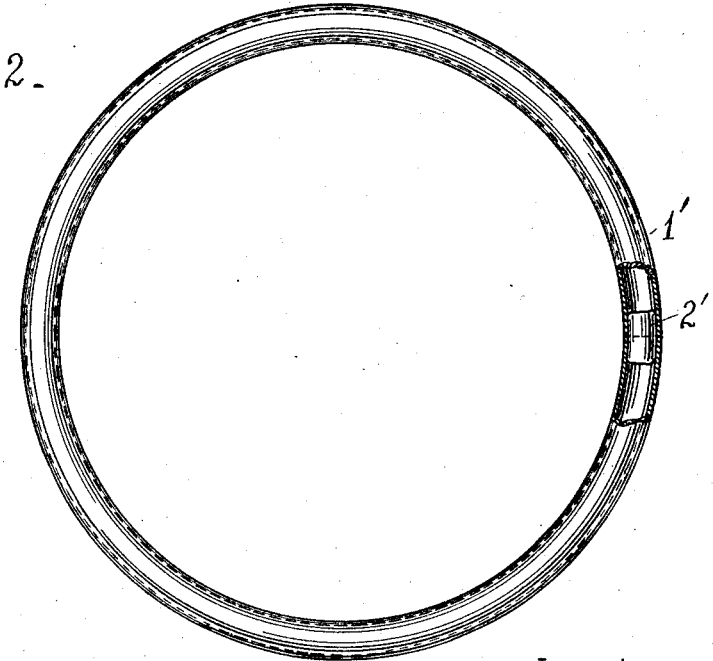

In the accompanying sheet of drawings which forms a part of this application, Figure 1 is a side elevation, partly broken away, showing the manner in which the ring is constructed when made of two segments; and Fig. 2 is a like view, showing the ring made from one piece.

The two-segment ring is made of two brass tubes 1 bent into a semicircle. Near one end of each of these tubes in the interior thereof is soldered a plug 2, and in the other end of each of the tubes is soldered another plug 3 which projects a short distance from the end of the tube, the plugs making the tubes liquid-tight. Both of these plugs are conveniently made from brass or copper wire of a diameter equaling that of the interior of the tubes 1 and bent on a circle having the same radius as the completed ring. The ends of the tubes 1 having the projecting plugs 3 are placed diametrically opposite and the projecting ends of the plugs inserted into the ends of the tubes thus presented. The tubes are drilled on the sides through the projecting ends of the plugs and the holes countersunk. The two segments of the ring are then smoothly riveted together, either before or after the ring is mounted on the shaft.

The one-piece ring is made of a brass tube 1' bent into a circle and made liquid-tight by soldering the ends together, a suitable plug 2' being inserted therein for convenience in soldering and to add strength to the joint.

The ring constructed as above contains one or more air chambers which give it a floating property and thus add to its efficiency for unusually high speed. It has a very large slip which increases as the speed of the shaft increases, the speed of the ring tending to be uniform, irrespective of the speed of the shaft; and it is extremely strong and rigid. The two-segment construction is especially advantageous when the ring cannot conveniently be slipped over the end of the shaft.

It will be understood that my invention is not limited to the precise constructions hereinbefore described, the essence of the invention being the combination of lightness with a large external area and a small shaft-contact area.

What I claim and desire to secure by Letters Patent of the United States is:

A lubricating device for journal bearings comprising an imperforate tubular metal ring composed of a plurality of suitably joined segments each of which is liquid-tight, substantially as described.

Signed by me at East Orange, N. J., this 27th day of July, 1908.

GANO DUNN.

Witnesses:
 GEO. W. BOWER,
 HARVEY C. HARRISON.

Copies of this patent may be obtained for five cents each, by addressing the "Commissioner of Patents, Washington, D. C."